Figure 1:
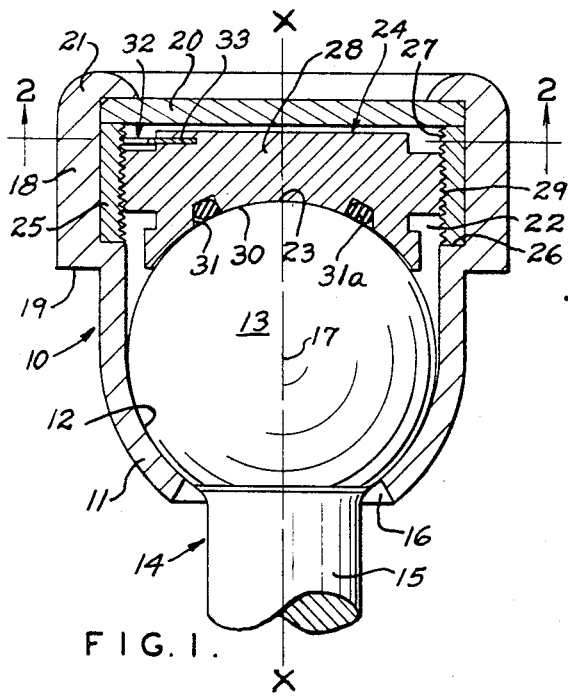

Nov. 12, 1968   W. A. SCHEUBLEIN, JR., ET AL   3,410,587
SELF-ADJUSTING MOVABLE JOINT DEVICE
Filed Oct. 17, 1966   2 Sheets-Sheet 1

INVENTORS
WILLIAM A. SCHEUBLEIN JR.
LOUIS P. FISTER
BY
Gravely, Lieder & Woodruff
ATTORNEYS Nov. 12, 1968  W. A. SCHEUBLEIN, JR., ET AL  3,410,587
SELF-ADJUSTING MOVABLE JOINT DEVICE
Filed Oct. 17, 1966  2 Sheets-Sheet 2

INVENTORS
WILLIAM A. SCHEUBLEIN JR.
LOUIS P. FISTER
BY
Gravely, Lieder & Woodruff
ATTORNEYS

United States Patent Office 3,410,587
Patented Nov. 12, 1968

3,410,587
SELF-ADJUSTING MOVABLE JOINT DEVICE
William A. Scheublein, Jr., Ballwin, and Louis P. Fister,
St. Louis, Mo., assignors to Moog Industries, Inc., St.
Louis, Mo., a corporation of Missouri
Filed Oct. 17, 1966, Ser. No. 587,165
7 Claims. (Cl. 287—87)

This invention relates to improvements in movable joint devices and especially to devices of this class which are self adjusting in operation when installed.

In the form of movable joint devices selected from disclosure herein, it is understood that the device usually includes a housing in which there is a socket to receive the enlarged or headed end of a stud member such that there is at least relative rotary movement between the housing and the stud member. In such a combination it is the purpose of the present invention to provide self adjusting means which will become operable to relative movement between the housing and stud member in one direction to effect adjustment in a direction to compensate for wear, reverse relative movement being rendered ineffective to disturb the desired adjustment. Such a device has been disclosed and claimed in a previous application of Scheublein and Fister, Ser. No. 511,609, filed Dec. 6, 1965, and this application being for an improvement.

A problem of major importance in movable joint devices is control over the looseness that inevitably develops after a period of time, and especially when the devices are subject to excessive loads, inadequate or substantially no lubrication, and extremes of dirt conditions. Attempts have been made to force the wearing parts in a joint device to take up wear by spring loading means exerting either linear or torsional forces. Some other means of manually adjustable character have been proposed, but the need for an effective and simple device that will easily and positively compensate for wear and thereby hold its accuracy has continued up to now.

It is a primary object of the present invention to provide a wear compensating movable joint device with simple means to continuously compensate for wear upon relative movement between at least two principal members or elements of the device.

It is also a primary object of the present invention to provide a movable joint device with an assembly of parts in which normal operation will develop relative movement between various parts of the assembly and to utilize such movement to compensate for wear.

It is also an object of the present invention to provide a movable joint device with a housing and a projecting shank on the usual ball head or stud, and to dispose between these two parts elements that will adjust for wear merely by the relative movement between the housing and stud.

It is another object of this invention to provide a wear compensating unit that can be inserted in a movable joint assembly to become operative as two parts of the assembly move relatively to each other.

Still a further object of the invention is to provide a movable joint device with at least two members that have relative turning motion and to operatively connect such members with wear compensating means.

Still another object of the invention is to provide a movable joint device with at least two members that have relative movement and to operatively connect such members with friction responsive elements that compensate for wear.

Figure 2:
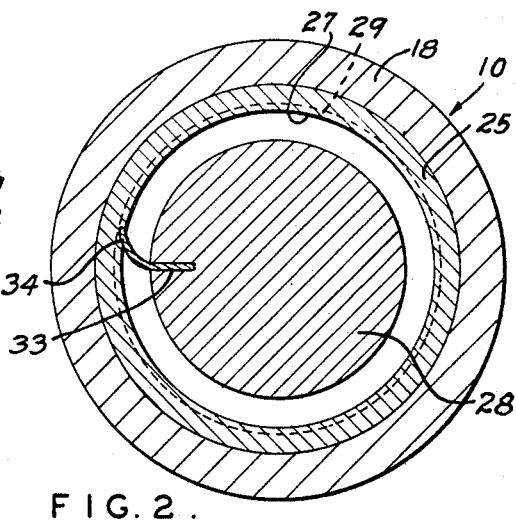
Figure 4:
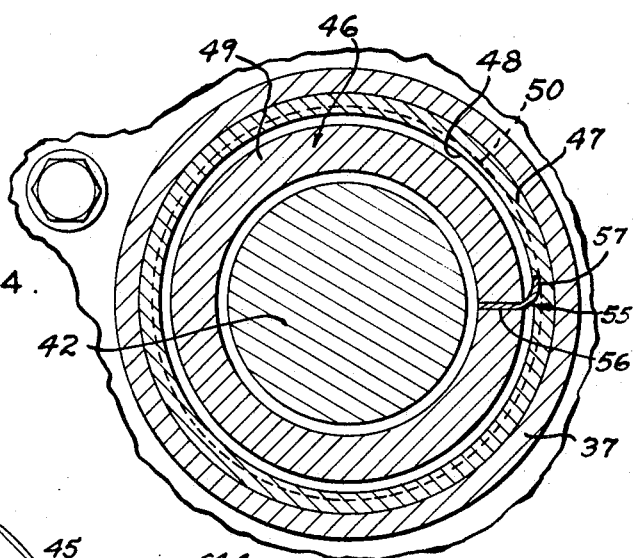
Figure 3:
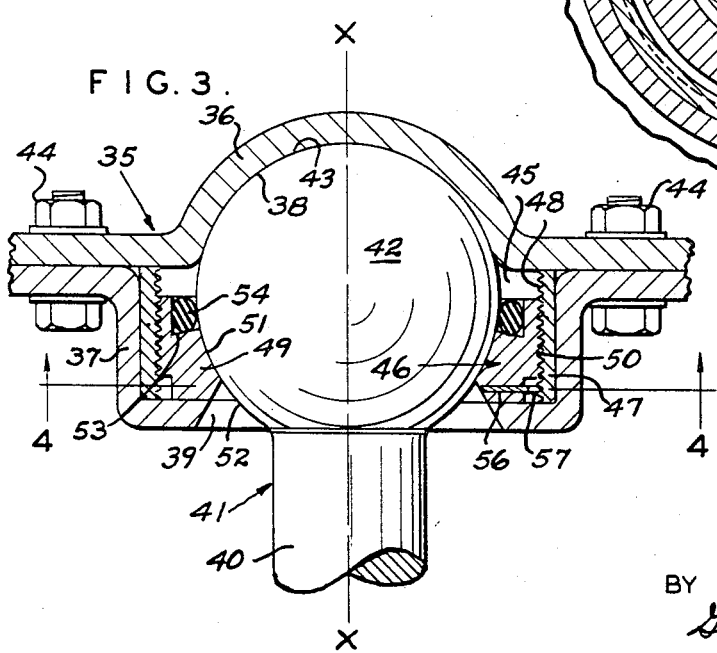
Figure 5:
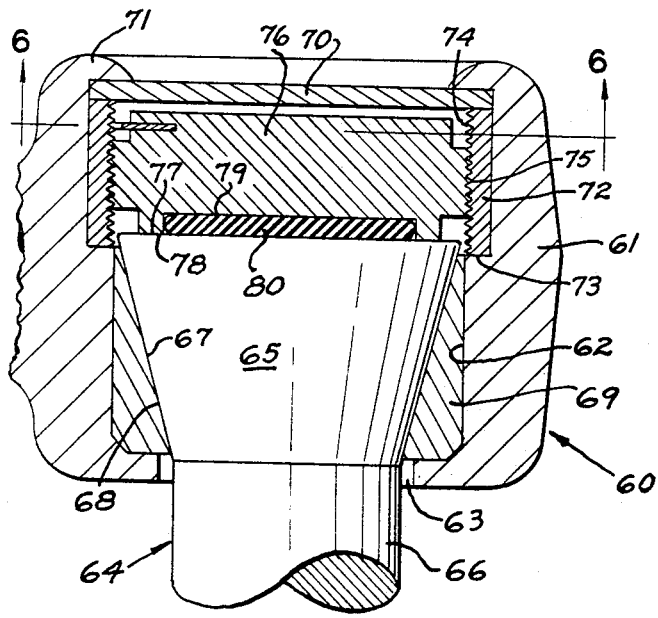
Figure 6:
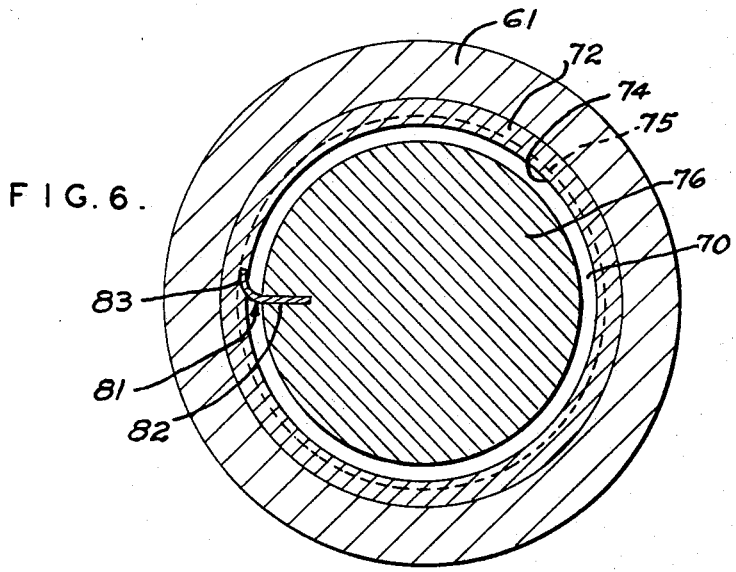

Other objects and advantages of the invention will be set forth in the following specification which relates to certain preferred forms of the invention disclosed in the accompanying drawings, wherein:

FIG. 1 is a vertical sectional view of a movable joint device embodying the features of this invention;
FIG. 2 is a sectional view of the movable joint device taken at line 2—2 in FIG. 1;
FIG. 3 is a vertical sectional view of a movable joint device disclosing another embodiment thereof;
FIG. 4 is a transverse sectional view taken at line 4—4 in FIG. 3;
FIG. 5 is a vertical sectional view of still another embodiment of the present invention; and
FIG. 6 is a transverse sectional view taken at line 6—6 in FIG. 5.

In FIGS. 1 and 2 the joint device therein illustrated is a compensating load type movable joint device of a type that could be utilized as a tension loaded ball joint for automobile steerable wheel suspension systems. The device includes a housing member 10 formed with a constricted end 11 providing an internal socket or bearing surface 12 to receive the enlarged head end 13 of a stud 14. The shank 15 of stud 14 is adapted to project through an aperture 16 in the socket end of housing 10 and such opening 16 is suitably enlarged to permit the stud to undergo angular swinging movement about its center 17 as well as rotary movement about the longitudinal axis X—X through the axial center of the stud shank 15. The housing 10 is formed with an enlarged upper end 18 which provides a stop shoulder 19 for locating the housing in proper mounted position. The open end of the housing opposite the aperture 16 is adapted to be closed by a cover plate 20 which is held in position by spinning over a lip 21 on the housing.

The internal space 22 of the housing between the cover plate 20 and the upper end surface 23 on the stud head is occupied by a wear compensating unit 24. The unit 24 includes a threaded member 25 which is seated in the annular recess of the housing space 26 formed on the interior of the enlarged portion 18 of the housing 10. The member 25 is formed with internal threads 27, but it is understood that the member 25 could just as well be an integral part of the housing 10. A cooperating member 28 in the nature of a plug is provided with external threads 29 which engage the threads 27 on the first member 25. The plug member 28 is provided with a surface 30 which engages the surface 23 on the stud head 13. The surface 30 is interrupted with an angular groove or recess 31 for the reception of a friction element 31a, which friction element and O ring are of suitable resilient material. As shown in FIGS. 1 and 2, the relative movable and threadedly engaged members 25 and 28 are subject to certain controls so that relative rotary or threaded movements are obtained for one direction only. Such a control is found in an element 32 which has one end portion 33 carried in the plug member 28 and its opposite end portion 34 projecting therefrom, so as to engage in the threads 27 of member 25. The portions 33 and 34 of the control member 32 are angularly related so that the portion 34 thereof will project in the desired direction to follow the threads 27 with a sliding movement when the members 25 and 28 rotate in the desired direction, but which will increase the friction between members 25 and 28 an even dig into the base of the threads 27 to prevent reverse threading movement of these members.

In operation, the assembly of FIG. 1 can be put together without any regard for the initial looseness of the stud head 13 in the socket 12. Once the parts are assembled and the lip 21 of the housing spun over on the cover plate 20, the device may be initially adjusted by pushing on the stud shank 15 to increase the friction between the surfaces 23 and 30 and including the friction developed by the ring 31a. Upon relative rotary movement between the stud 14 and the housing 10 the plug member 28 can be relatively rotated to the member 25 in a direction that will cause the threads to feed the member 28 axially into the stud head 13, and this will force the stud head 13 into the socket 12. From what has just been said it can be appreciated that in the initial assembly the friction between surfaces 23 and 30, augmented by the friction ring 31a, will exceed the friction between the surfaces of threads 27 and 29. As the stud head 13 is more closely pressed into the socket 12 the relative friction values will change or shift so that the friction between the engaged surfaces of the threads 27 and 29 will exceed the friction generated between surfaces 23 and 30 and the friction ring 31a. When this latest condition exists, the stud head 13 will rotate in either direction around the axis X—X without moving the plug member 28. As wear occurs in the socket 12 or in the surfaces 23 and 30, the friction in the threads 27 and 29 will gradually decrease to a value slightly less than the friction between surfaces 23 and 30 as augmented by ring 31a, and when this shift in friction occurs the member 28 can again be moved relative to member 25 and further threading adjustment will occur subject to the control of element 32 which prevents loosening travel of the member 28.

Turning now to FIGS. 3 and 4, there is illustrated a movable joint device embodying the self adjusting feature of the present invention, and the showing is of a device subject to compression loading. FIG. 3 discloses a housing 35 made up of two parts, one being an upper housing 36 and the other being the lower housing 37. The housing 36 is provided with a socket 38 and the housing part 37 is provided with an aperture 39 through which the shank 40 of a stud 41 projects. The stud 41 is formed with an enlarged or headed end 42 which is seated by its surface portion 43 in the socket 38. The two portions 36 and 37 of the housing can be secured in assembly in any convenient manner such as by threaded elements 44.

The space 45 in the housing 35 between the angular wall of member 37 and the headed end 42 of the stud 41 is occupied by the self adjusting unit 46 which includes a member 47 having internally formed threads 48 therein. The member 47 is shown separately formed from the housing 37, but it can be integral with the housing 37. When the housing parts 36 and 37 are put together the member 47, when separated from the housing as shown, is clamped in position so that it holds its position against rotary displacement. Member 49 has external threads 50 formed thereon to engage the threads 48 of member 47. Member 49 is also provided with an internal surface 51 which engages a surface 52 on the stud head 42, and an angular recess 53 is formed in the member 49 to receive a resilient friction producing O ring element 54.

As shown in FIGS. 3 and 4, the member 47 is provided with internal threads 48 and the member 49 is provided with external threads 50. The threads 48 and 50 engage and are normally free to rotate in either direction along the lower axis X—X of the stud 41. However, the relative threading displacement of these members is subject to the direction limiting control of element 55. The element 55 has one end portion 56 held by the member 49 and has another portion 57 which projects and is bent at an angle to the portion 56 so as to engage in the threads 48 of member 47. As before pointed out in connection with FIG. 2, the element 55 of FIG. 4 operates in the same manner to increase the friction in the undesired or reverse direction of rotation of members 47 and 49, but to slide or skid rather easily in the desired direction of threading rotation.

In FIGS. 5 and 6 the structure shown is more suitable for incorporation as an idler arm in the components of the steering mechanism for a vehicle. In this type of movable joint device angular movement is undesired but rotary movement is always desired. It can be seen that the housing 60 has an enlarged end 61 formed with an internal socket 62 having an aperture 63 at one end. A stud 64 has its enlarged headed end 65 in the housing 60 and its shank 66 projecting through the aperture 63. The headed end 65 of the stud 64 has a tapered surface 67 which meets with the tapered surface 68 of an angular bearing 69 suitably mounted in the socket 62. The enlarged end of the housing opposite the aperture 63 is closed by a cover-plate 70 which is secured in position by spinning over the lip 71, but before doing this, member 72 is placed in the angular recess 73 in the end 61 so as to be clamped in position against relative rotary displacement. The member 72 may be an integral part of the housing end 61 or it may be press-fitted so as not to require the clamping action of the cover-plate 70, or it may be held in a number of different ways. The member 72 is formed with internal threads 74 which are adapted to be engaged by the external threads 75 of a plug member 76 which is adapted to be threadedly mounted in the member 72 and formed with a surface 77 engaged on the complementary surface 78 on the headed end 65 of stud 64. The plug member 76 is formed with a recess 79 to receive an element 80 which is also engaged with the surface 78 on the stud head 65. The member 80 may be formed of resilient material to develop a certain degree of friction with the stud head 65, or it may be a magnetic element which will be attracted to the stud head 65 and create magnetic as well as mechanical friction between the member 76 and the stud head 65.

Comparing FIGS. 5 and 6, it will be observed that there is a threading control element 81 mounted in the plug member 76. The element 81 has a portion 82 carried by the plug 76 and has a second portion 83 directed at an angle to the portion 82 and adapted to ride in the internal groove of the threads 74 in member 72. Thus, the element 81 will prevent undesired relative threading movement between members 76 and 72 and will be relatively unresisting to threading movement in the desired direction.

The assembly of parts shown in FIGS. 3, 4, 5 and 6 will have operating characteristics and functions described for the structure shown in FIGS. 1 and 2, and there appears to be a sufficient disclosure so as not to require further description as to the operation thereof.

It will, of course, be appreciated that the movable joint device of FIG. 1, with proper structural configuration changes, can be adapted to serve as a tie-rod end in the steering mechanism of a vehicle.

While the structure herein disclosed in FIGS. 1, 3 and 5 shows the respective threaded members 25, 47, and 72 to be separately formed it should be noted that when these members are integral they will be of the same material as the respective housing, while the cooperating plug member 28, 49 or 76 can be of the same or a different material, depending on the degree of friction desired to be developed between the threaded members. On the other hand, suitable plastic material can be utilized for either or both of the relatively threaded members.

The foregoing description has dealt with certain preferred forms of the present invention for the purpose of illustrating the principles involved. It is, of course, the aim hereof to cover all applicable forms of movable joint devices in the scope of the appended claims.

What is claimed is:

1. A self adjusting movable joint device comprising: a housing member having a socket therein; a stud having an enlarged head at least rotably bearinged in said housing socket and said stud having a shank projecting from said housing, said housing member providing a space therein at one end of said housing and adjacent said stud head; and self adjusting means including a wear take-up member in said space engaged with said enlarged head, said housing member and wear take-up member having inter-engaging thrust surfaces normally effective to permit movement of said wear take-up toward and away from said stud head upon rotation of said stud head relative to said housing socket, a control element carried by one of said members and operably engaged with said interengaging thrust surface of the other said members to limit said movement of said wear take-up member to the direction toward said stud head to take-up wear, and means between said stud head and wear take-up member operable to generate additional friction therebetween for causing said wear take-up member to move substantially only in the limited wear take-up direction, said means being free to slip relative to said stud head upon friction in said inter-engaging thrust surface exceeding the generated friction.

2. The self adjusting device of claim 1 wherein said control element is carried by said wear take-up member in position to engage said interengaging thrust surface of said housing member, said control element having an arm portion adapted to slide relative to said thrust surface in the limited direction to effect adjustment, said arm when subject to movement opposite to said sliding movement rapidly increasing friction so as to stop said opposite movement.

3. The self adjusting device of claim 1 wherein said inter-engaging thrust surfaces are threads, and said control element engages in said threads.

4. The self adjusting device of claim 1 wherein said thrust means carried by said housing is an internally threaded member, said wear take-up member has cooperating threads theron, and said control element is disposed adjacent the threads of one member and has a projection operable in a thread groove of the other member.

5. The self adjusting device of claim 1 wherein said friction generating means is a resilient friction ring seated in said wear take-up member in position to engage said stud head.

6. The self adjusting device of claim 1 wherein said friction generating means is a magnet seated in said wear take-up member and said stud head is magnetically responsive thereto.

7. A self adjusting movable joint device comprising: a housing member having a socket therein and thrust means carried thereby; a stud having an enlarged head at least rotably bearinged in said housing socket and said stud having a shank projecting from said housing, said housing member providing a space therein at one end exposing said thrust means at one side of said stud head; and self adjusting means including a wear take-up member in said space engaged with said enlarged head, said housing member and wear take-up member having inter-engaging thrust surfaces normally effective to permit movement of said wear take-up toward and away from said stud head upon rotation of said stud head relative to said housing socket, a control element carried by one of said members and operably engaged with said inter-engaging thrust surface of the othr of said members to limit said movement of said wear take-up member to the direction toward said stud head to take-up wear, and means between said stud head and wear take-up member operable to generate additional friction therebetween for causing said wear take-up member to move substantially only in the limited wear take-up direction, said means being free to slip relative to said stud head upon friction in said inter-engaging thrust surface exceeding the generated friction.

References Cited

UNITED STATES PATENTS

| | | | |
|---|---|---|---|
| 2,503,253 | 4/1952 | Booth | 287—90 |
| 2,954,993 | 10/1960 | Scheublein et al. | 287—90 |
| 3,325,197 | 6/1967 | Wehner | 287—90 |

FOREIGN PATENTS

| | | |
|---|---|---|
| 674,267 | 6/1952 | Great Britain. |

CARL W. TOMLIN, *Primary Examiner.*

A. KUNDRAT, *Assistant Examiner.*